US009886804B2

(12) United States Patent
Lykkja et al.

(10) Patent No.: US 9,886,804 B2
(45) Date of Patent: Feb. 6, 2018

(54) ZONE DETECTION IN A GNSS SYSTEM

(71) Applicant: Q-Free ASA, Ranheim (NO)

(72) Inventors: Ola Martin Lykkja, Rasta (NO); Hans Christian Bolstad, Trondheim (NO); Anders Løland, Oslo (NO); Ragnar Bang Huseby, Oslo (NO)

(73) Assignee: Q-Free ASA, Ranheim (NO)

( * ) Notice: Subject to any disclaimer, the term of this patent is extended or adjusted under 35 U.S.C. 154(b) by 7 days.

(21) Appl. No.: 14/559,989

(22) Filed: Dec. 4, 2014

(65) Prior Publication Data
US 2015/0179010 A1 Jun. 25, 2015

(30) Foreign Application Priority Data

Dec. 20, 2013 (NO) .................................. 20131722

(51) Int. Cl.
G07C 9/00 (2006.01)
G07B 15/06 (2011.01)
G08G 1/00 (2006.01)
G01C 21/30 (2006.01)
G08G 1/01 (2006.01)

(52) U.S. Cl.
CPC ....... *G07C 9/00126* (2013.01); *G07B 15/063* (2013.01); *G08G 1/207* (2013.01); *G01C 21/30* (2013.01); *G01S 2205/002* (2013.01); *G08G 1/0104* (2013.01)

(58) Field of Classification Search
CPC ......... G07B 15/00; G07B 15/063; G07F 7/00; G07F 17/00; G08G 1/082; G08G 1/083; G08G 1/207; G07C 9/00126

USPC .................................................. 340/928, 932
See application file for complete search history.

(56) References Cited

U.S. PATENT DOCUMENTS

| 7,215,255 | B2 * | 5/2007 | Grush ................ G06Q 30/0284 340/932.2 |
| 7,324,017 | B2 | 1/2008 | Hartinger |
| 2009/0011777 | A1 * | 1/2009 | Grunebach ............. H04W 4/02 455/456.3 |
| 2009/0140886 | A1 * | 6/2009 | Bender ................... B60R 25/00 340/988 |
| 2009/0157566 | A1 | 6/2009 | Grush |
| 2010/0127919 | A1 * | 5/2010 | Curran .................. H04W 4/021 340/573.4 |
| 2011/0153267 | A1 | 6/2011 | Peeters et al. |

(Continued)

FOREIGN PATENT DOCUMENTS

| EP | 1657683 A2 | 5/2006 |
| EP | 1708143 A2 | 10/2006 |

(Continued)

*Primary Examiner* — Omar Casillashernandez
(74) *Attorney, Agent, or Firm* — Alix, Yale & Ristas, LLP

(57) ABSTRACT

Method and system for zone based detection of vehicles passing into and out from a geographical zone using polygons to define the border of said zone, wherein a first polygon (32) defines a virtual border against which vehicles passing into the zone is compared by use of a GNSS system (10) comprising an OBU (2) in every vehicle to be surveyed by the method. A second polygon (31) larger than the first polygon (32) and completely enveloping said first polygon is defined as a virtual border against which objects passing out from the zone is compared by use of the GNSS system.

15 Claims, 3 Drawing Sheets

(56) References Cited

U.S. PATENT DOCUMENTS

| | | | |
|---|---|---|---|
| 2013/0238366 A1* | 9/2013 | Morgan | B60R 25/04 |
| | | | 705/4 |
| 2014/0236686 A1* | 8/2014 | Grush | G07B 15/02 |
| | | | 705/13 |
| 2015/0012309 A1* | 1/2015 | Buchheim | G07B 15/063 |
| | | | 705/5 |

FOREIGN PATENT DOCUMENTS

| | | |
|---|---|---|
| EP | 2230644 A1 | 9/2010 |
| EP | 1449174 B1 | 5/2014 |
| EP | 2402911 B1 | 11/2014 |

* cited by examiner

ZONE DETECTION IN A GNSS SYSTEM

BACKGROUND

The disclosure concerns, according to a first aspect, a method for zone based detection of vehicles and a system for performing said method.

Systems and methods for automatic controlling passages of objects, typically vehicles, into and/or out from certain geographic areas have been developed during the recent decades, and systems and methods based on Global Navigation Satellite Systems (GNSS) technology are prevailing.

Satellite based road tolling systems are rapidly growing in number due to their versatility and flexibility. It allows for an advanced time/distance/place concept where policy makers can adjust price and tolling zones to best fit their objectives. Non-repudiation of the tolling statement is a very important aspect of the toll system. This includes both proving that the toll statement is genuine and proving that the system correctly identifies vehicles travelling in and out of tolling zones.

Even if the average performance and availability of GNSS systems today are very good, there will still be situations where the tolling system may be mislead by erroneous position estimates from the GNSS system. In particular in geographical areas where parts of the sky are obstructed by natural or man-made objects, this may be of great concern.

GNSS based tolling and the system model in FIG. 1 is described by international standards. Of most relevance to the disclosed method and system is ISO 17573 Electronic Fee Collection—Systems architecture for vehicle-related tolling and ISO 12855 Electronic Fee Collection—Information exchange between service provision and toll charging. The European Union is working towards a common European interoperable system for tolling where road users have On Board Units (OBU) and a contract with one home toll operator enabling pan-European roaming where foreign toll charges are invoiced through the home toll operator. This is known as the EETS directive, Directive (2004/52/EC) of the European Parliament and of the Council of 29 Apr. 2004 on the interoperability of electronic road toll systems in the Community. Furthermore, the European Commission Decision (2009/750/EC) of 6 Oct. 2009 on the definition of the European Electronic Toll Service and its technical elements puts this into effect.

A satellite based road tolling system comprises three main physical elements. 1) The satellites 2) vehicles equipped with OBUs observing signals from the satellites and 3) a so-called back office.

The most typical use of such systems is for tolling, where each vehicle owner pays a certain fee for use of the road at passage of a zone border in a so-called cordon based tolling scheme. In general there are two kinds of errors encountered with the use of such systems, one being a false registration of a passage, the other being missed recognition of a passage that actually occurred. Additionally the detection may erroneously be attributed to a wrong location or a wrong time. All errors may result in lower user confidence in the system and increased operational costs.

EP2230644A1 teaches a method and system which involves maintaining global positioning systems (GPS) of vehicles in standby. Positioning functions of the global positioning systems are stimulated at the proximity of geographical positioning points e.g. taxation points, where the stimulation of the positioning function of each global positioning system is calculated from an origin positioning instant, near geographical positioning point and maximum speed of the vehicles.

WO2010098128A1 describes a road passage charging system which charges a toll for vehicles which run a road in a predetermined segment and are equipped with a position detection section which detects the position of a vehicle, a number of vehicles calculation section which calculates the number of vehicles present on a road in a predetermined segment from the positional information of vehicles detected by the position detection section, a traffic jam decision section which decides whether the road in the predetermined segment is congested or not by comparing the number of vehicles calculated by the number of vehicles calculation section with the predetermined threshold, a charging segment setting section which sets the predetermined segment as a charging segment when a decision is made that the predetermined segment is congested by the traffic jam decision section, a charging segment information delivery section which delivers information indicating that the predetermined segment set by the charging segment setting section is the charging segment, and a charging section which charges a toll for vehicles which run the road set as the charging segment.

EP1708143A2 describes a system including an onboard unit mounted in a vehicle to acquire position-related data of the vehicle. A central and stationary back office processes the position-related data to generate normalized position data. A service unit processes the normalized position data. The onboard unit and back office have interfaces to enable data exchange.

EP1657683A2 teaches a method by which a received position signal is transferred to a receiver system with a computer unit which has a digital map stored in a memory. At least one area (e.g. country) is defined in relation to the map in the computer unit, and is bounded by at least one polygon curve. The region of the area is selected so that the types of recognition used within the area are the same, and are different from the types of recognition used in further, adjacent areas.

U.S. Pat. No. 7,324,017B2 describes a process for determining travel through at least one toll road section by at least one vehicle by means of a position determination system which is set up to determine the current position of at least one vehicle, whereby positions of the at least one vehicle are compared with the position of at least one reference point characteristic for an entrance to a toll road section, whereby the orientation of the vehicle is determined within a specifiable region about the entrance, whereby it is determined whether the orientation determined agrees within a specifiable tolerance range with the orientation characteristic of entry onto the toll road section.

US patent application No. 2011/0153267 A1 describes a tracking unit for use with a location based service system. The location tracking unit comprises a navigation receiver adapted to implement a location tracking function, data processing means adapted to determine an occupied location according to a first location matching process. The first location matching process uses navigation data from the navigation receiver and a first set of geographical data, and data processing means adapted to verify the integrity of the first location matching process based on a second location matching process using navigation data and a second set of geographical data.

DE 1015 5501 A1 teaches a method for satellite based vehicle passage detection by use of mathematically defined polygons. The reliability of the detections is assumed to be increased by assessing the duration of each vehicle in a tolerance zone surrounding the zone to be monitored.

US 2009157566 A1 teaches a method addressing the problems of: a) generating a tollpath of consistent length by determining one of a possible set of paths which are all the same length in cell-count every time the same journey is taken, b) determining a consistent price for each tollpath by setting pre-determined values on those cells such that every possible path variant of a specific journey produces the same toll, and c) determine the correct price for each tollpath by adjusting prices in each cell to account for the exact distance actually represented, so that the toll calculated exactly matches the toll that would be calculated had the exact linear distance been measured on the actual road.

In spite of the teachings mentioned above there is still a need for improved methods and systems for zone based detection of objects, such as vehicles, passing into and out from a geographical zone, providing improved reliability and reduced risk of false crossing assessments.

SUMMARY

The presently disclosed method and system provides a simple and inexpensive way of improving the reliability of satellite based tolling systems, increasing the confidence of the system. The inventive method and system may also be used for related purposes in non-tolling applications.

Two separate polygons are used to define a virtual border around a tolling zone, a typical application of which would be as part of an automatic billing systems for vehicles passing into and out from the zone. A first, smaller polygon is surrounded by a second, larger polygon that completely covers the first polygon, with a zone of demarcation always larger than zero therebetween.

As used herein, the term "vehicle" is to be interpreted in the broadest sense possible, not only covering automobiles and the like.

Below the system is discussed in terms of a method and system for charging a toll (fee) to vehicles passing into a certain zone. It should be emphasized that the method and system as such, while suited for such a purpose, is a general system for detection of objects passing into and out from a zone, irrespective of the subsequent use of said information. The information may as well be used solely to obtain traffic data for the zone in question.

For passing into the tolling zone the coordinates of each vehicle is compared with the virtual border of the first, smaller polygon. For determining any passing out from the tolling zone, the coordinates of the vehicle are compared solely with the virtual border of the second, larger polygon.

By allowing a (linear) distance between the first and the second polygon determined by known error tolerances in the GNSS system used for the determination of the vehicle position, the risk of assessing wrong zone border crossing events are reduced.

The polygons may be two dimensional, but also three dimensional polygons/polyhedrons may be used to account for more complex road geometries. Three dimensional polygons (polyhedrons) may be needed to distinguish between zones covering roads in multiple levels where latitude and longitude description alone is not enough to differentiate between the polygons. This may pertain to elevated highways with local road network underneath, roads under bridges, and road systems in tunnels, etc. In this embodiment, the positions must be augmented with altitude information, and possibly thickness, i.e. a polyhedron may be used to represent the generalized polygon.

It may be defined as a requirement that a certain number (represented by "n") of localization observations are made within the first polygon before true passage into the tolling zone is assigned.

The first, inner polygon and the second, outer polygon will typically have different vertices and the distance between the two may vary in accordance with varying conditions around their periphery, like presence or absence of buildings, steep hills, road crossings etc. More generally it may be said that the number of vertices in the second polygon is independent of the number of vertices in the first polygon.

BRIEF DESCRIPTION OF THE DRAWINGS

Below the method and system is described in further detail with reference to enclosed drawings, where.

DETAILED DESCRIPTION

Figure 1:
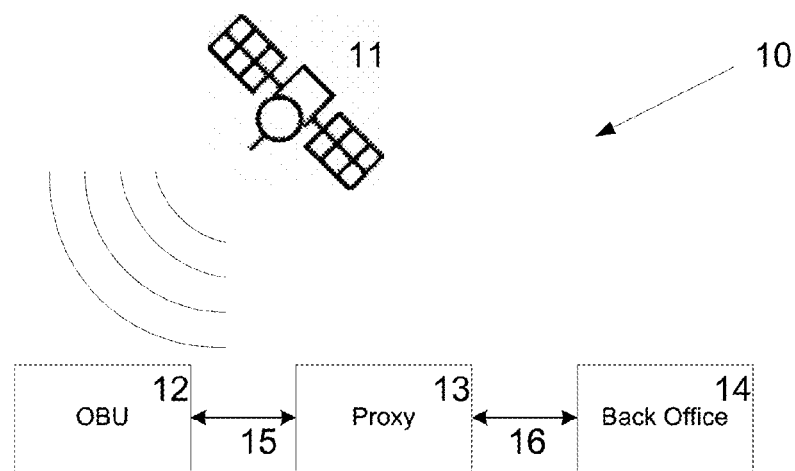
FIG. 1 is a schematic illustration of a system architecture of a GNSS based system for vehicle localization monitoring, the architecture being compliant with ISO 17573.

The elements encountered in a GNSS tolling system 10 illustrated in FIG. 1 are a GNSS satellite 11, an OBU 12, a proxy 13 and a back office 14. There is a first exchange of data communication 15 between the OBU and the proxy, and a second exchange of data communication 16 between the proxy 13 and a back office 14. There is no limitation with regard to the technology involved with the exchange of information between the different units. There is not necessarily a one-to-one relation between the shown elements; there will e.g. typically be a number of satellites 11 disseminating information enabling the localization of the OBU at any given point in time. All calculations made and/ or conclusions drawn with regard to assessment of passages may be performed either locally, like in the individual OBUs, centrally in a back office or by a proxy or in any other combination found convenient therefore.

Figure 2:
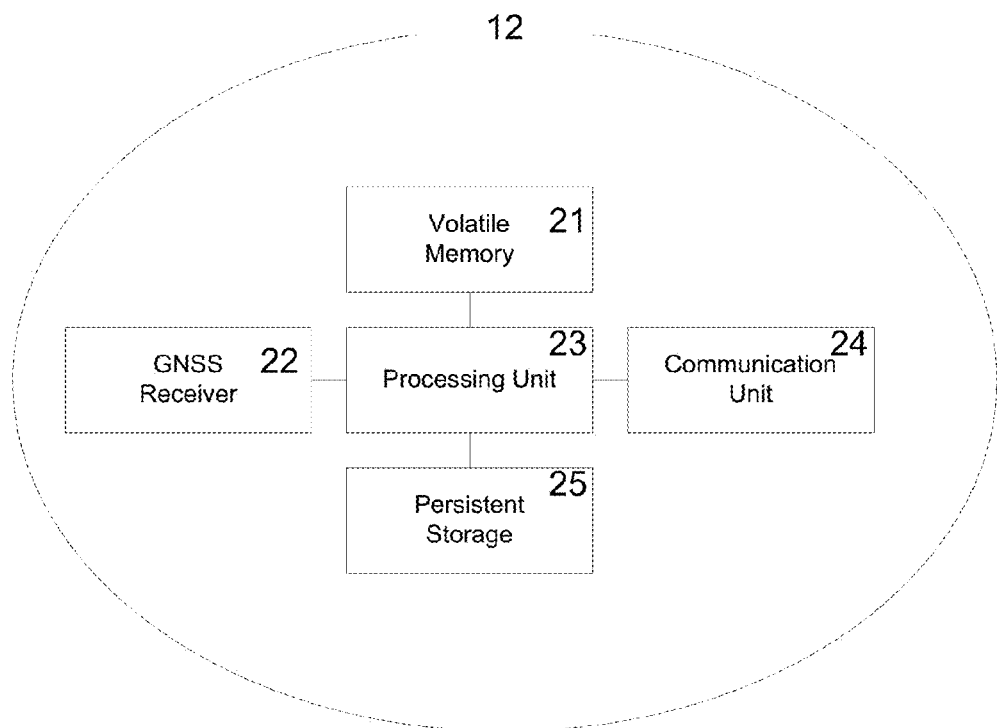
FIG. 2 is a schematic illustration of the internal structure of an OBU unit.

FIG. 2 illustrates the main components of the OBU 12. The OBU includes a volatile memory 21, a GNSS receiver 22, a processing unit 23, a communication unit 24 and persistent storage 25. The OBU may be a physical device dedicated to the GNSS tolling system, but it may also be present as a function integrated in other devices fit for the purpose, such as a tachograph or other device, portable, mounted in, or integrated in the vehicle.

These components are standard components of an OBU unit for GNSS road user charging, and their function is therefore not explained in more detail here.

It should be emphasized, though, that while the inventive concept makes use of such a system, the GNSS 10 and the OBU 12 are generally known. The GNSS module 10 may be implemented with different levels of sophistication, ranging from a simple GPS receiver to a complex navigation unit using information from multiple GNSS systems, motion sensors with vehicle instruments and sensors.

Figure 3:
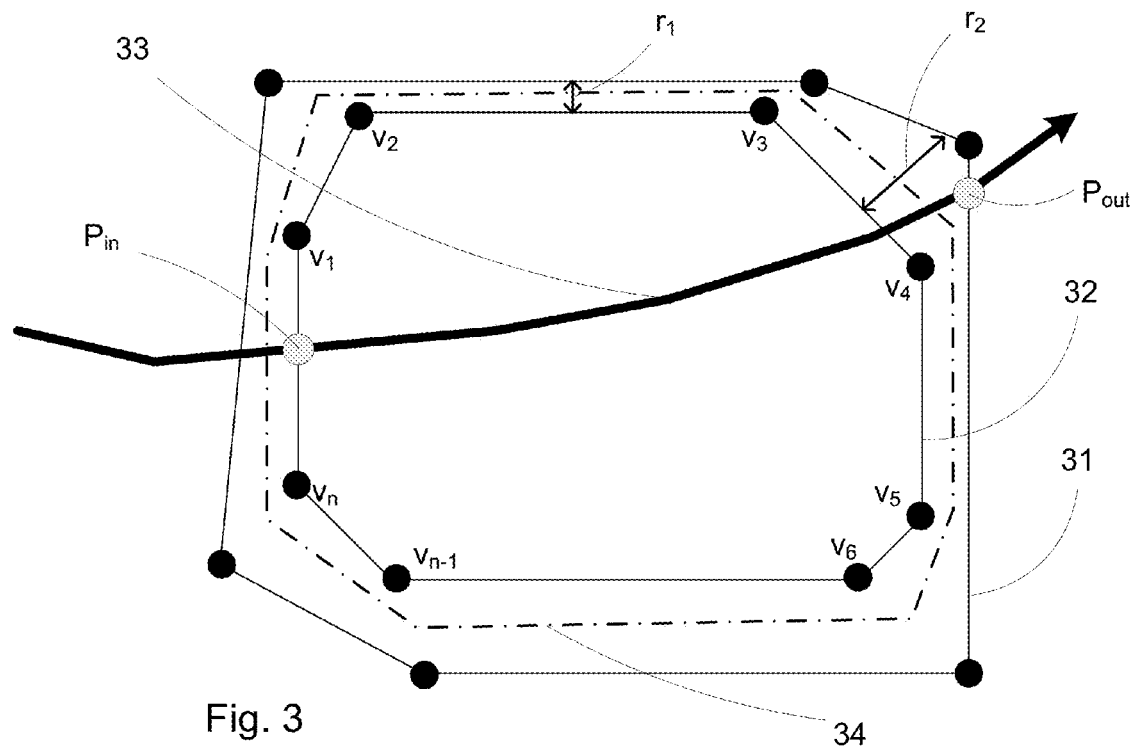
FIG. 3 is a schematic illustration of the disclosed method.

FIG. 3 shows the general principles of the present method and system in a simplified embodiment. An outer polygon 31 and an inner polygon 32 are shown as well as a schematic representation of a roadway 33 running through the area delimited by the polygons. The arrow to the right of the roadway 33 indicates that this is a one-way street with traffic only from left to right.

Each polygon is described as an ordered sequence of points defining the vertices (vi) of the polygon, thus forming a closed area with non-intersecting vertices. The polygons need not be restricted to a two-dimensional plane. The number of vertices may be different between the outer polygon 31 and the inner polygon 32. In the illustrated embodiment there are six vertices in the outer polygon 31 and eight vertices in the inner polygon 32. The tolling zone 34, typically defined by road operator or traffic authorities, will in its entirety be located in between outer and inner polygons. The area between will be a decision area.

The distance r between the inner polygon and the outer polygon is allowed to vary around the perimeter of the polygons, depending on a number of factors assuming to influence the accuracy of the GNSS system and other factors, like local geometry and topology, taking into account nominal driving speeds and typical GNSS reception quality. These and other relevant factors are well known to persons skilled in the art of GNSS systems. In FIG. 3, as an example, the distance $r_1$ is seen to be less than $r_2$.

For vehicles passing into the zone to be monitored, only passages $P_{in}$ across a border of the inner polygon 32 counts as a valid passing. For passing out, only passages $P_{out}$ across the border of the outer polygon 31 counts as a valid passage. Thus the arrangement of two polygons introduces a higher level of confidence and reduces the risk of false zone crossing assessments. The decision of passage of the zone border is thus based on many GNSS observations allowing the method to use observations with greater independence mitigating the effects from short term correlation in the measurements derived from satellite signals.

Figure 4:
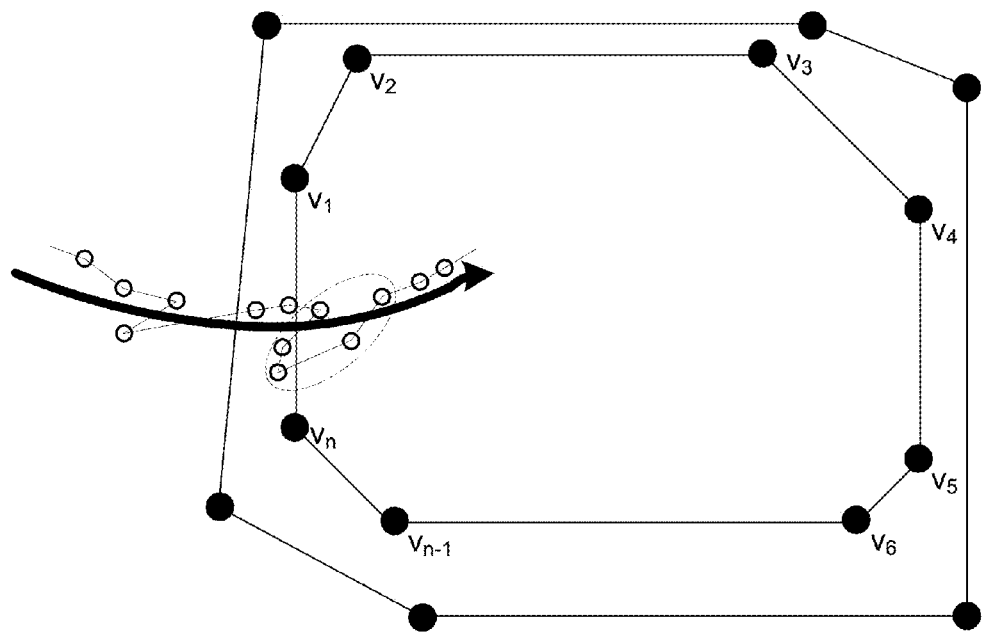
FIG. 4 is a schematic illustration of a certain aspect within the general concept of the disclosure.

FIG. 4 illustrates a situation in which the detected positions for a vehicle follows a slightly uneven pattern, which may typically occur when the driving speed is rather low and when one or more error sources influence(s) the position detections. A total of thirteen (unnumbered) position detections are indicated, for a vehicle driving from left to right, the first one of these made inside the inner polygon being the seventh. Thereafter two position detections are made outside the inner polygon before detections again are made within the inner polygon. The present system is sufficiently versatile to not be fooled by the apparent inconsistency of two measurements made outside the inner polygon after having made a first position detection within the same polygon. Thus, it is not an absolute requirement that all position detections are made uninterrupted within the inner polygon for the system to positively conclude that a passage into the area has occurred. Instead it could be defined as a requirement that "n" out of "m" position detections (like e.g. 3 out of 5 as indicated by the dotted ellipse in FIG. 4) in a series of position detections must be within the polygon in question to positively conclude that a passage has actually occurred.

Figure 5A:
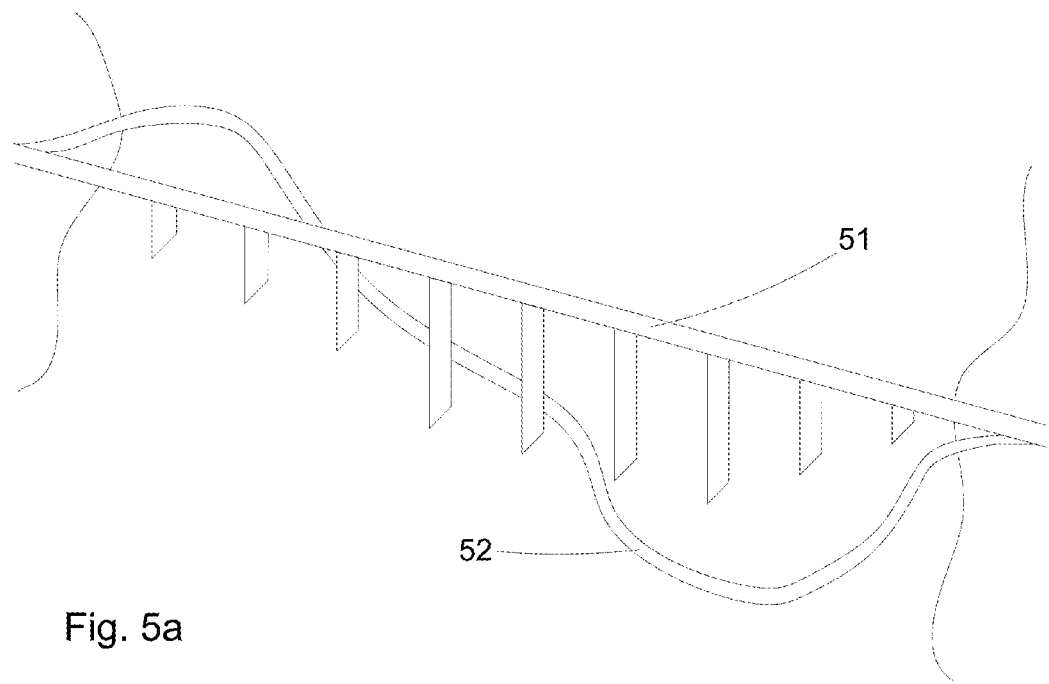
FIGS. 5a and 5b are schematic illustrations of an alternative embodiment of the disclosure.

FIG. 5a illustrates a road network where latitude and longitude description is not alone enough to fully assess if a vehicle if travelling on the bridge 51 or on the road 52 below the bridge. Altitude information can be taken into account to resolve the ambiguity.

Figure 5B:
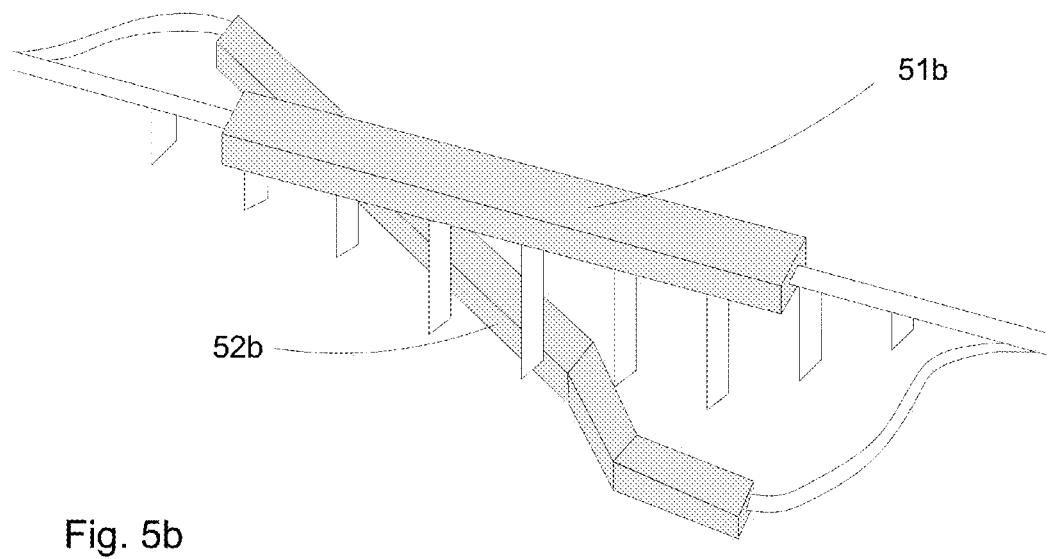

FIG. 5b illustrates how polyhedrons 51b, 52b may be created to enclose the two different road sections. Also in the three dimensional case two boundaries are created, in this figure only the outer boundary (polyhedron) is shown for each of the roads 51 and 52. The two polyhedrons are used for the same purpose as the two polygons in the two dimensional case, mitigating for positional errors also in the altitude axis.

The polygons used to define the zone to be monitored may in some embodiments preferably consist of simple (two dimensional) polygons where no edges self-intersect. The polygons may also be three dimensional for reasons given above.

The system may for certain embodiments be set up to conclude that a passage into the zone in question has occurred if—and only if—an uninterrupted succession of n positions have been registered within the first polygon, n being an integer chosen by the system provider. The integer n can typically be 3 or larger. Similarly, for certain embodiments, it may be defined as a requirement that an uninterrupted succession of n registered positions outside the second polygon is registered to conclude that a passage out of the zone has occurred.

For other embodiments, like e.g. in areas where low speed will typically occur from time to time, the system may rather be set up to conclude that a passage has occurred if at least "n out of m" position detections in a series of position detections for a given vehicle is inside the polygon in question. In such a case a typical requirement would be that more than e.g. 50% of the position detections are within the polygon in question to conclude a passage into the zone, i.e. that n/m>0.5. Correspondingly, more than e.g. 50% of the position detections should be outside the polygon in question in order to conclude that a vehicle has left the zone. The threshold should be decided from local factors known to influence the system.

The invention claimed is:

1. A method for zone based detection of vehicles passing into and out from a geographical zone using polygons to define a border of said zone, wherein a first polygon (32) defines a first virtual border, wherein a vehicle is compared by use of a global navigation satellite system (GNSS) (10) comprising an on-board-unit (OBU) (2) with solely the first virtual border to determine the vehicle is passing into the geographical zone, and a second polygon (31) larger than the first polygon (32) and completely enveloping said first polygon defines a second virtual border wherein the vehicle is compared by use of the GNSS system with solely the second virtual border to determine the vehicle is passing out the geographical zone, wherein the geographical zone (34) is between the first polygon (32) and the second polygon (31) and a distance (r) between the first virtual border and the second virtual border varies along the respective polygon borders in accordance with predetermined local factors.

2. The method of claim 1, wherein each of the polygons (31, 32) is a simple polygon having no self-intersecting edges.

3. The method of claim 1, wherein the polygons (31, 32) are selected from the group consisting of two-dimensional polygons and three dimensional polygons/polyhedrons.

4. The method of claim 1, wherein the GNSS system (10) is used for detecting passages into and out from the zone.

5. The method of claim 1, wherein an uninterrupted succession of n registered positions within the first polygon (32) determines whether a vehicle is considered to have entered the zone, wherein n is a predetermined integer.

6. The method of claim 5, wherein n is an integer not less than 3.

7. The method of claim 1, wherein an uninterrupted succession of n registered positions outside the second polygon (31) determines whether a vehicle is considered to have left the zone, wherein n is a predetermined integer.

8. The method of claim 7, wherein n is an integer not less than 3.

9. The method of claim 1, wherein n positions within the first polygon (32) out of a series of m registered positions in a series of position detections for a given vehicle, is the criteria for a vehicle to be determined to have entered the zone, wherein n and m are each predetermined integers with m being greater than or equal to n.

10. The method of claim 9, wherein n and m are each larger than a threshold decided from local factors known to influence the system.

11. The method of claim 1, wherein the number of vertices in the second polygon is independent from the number of vertices in the first polygon.

12. The method of claim 1, wherein the detection of passages into and out from the zone is registered against time for use in an automatic billing system.

13. A system for zone based detection of vehicles passing into and out from a geographical zone by use of a global navigation satellite system (GNSS) (10), said GNSS system comprising:
- on-board-units (OBUs) (12) in the vehicles to be detected, said OBUs receiving signals from a plurality of satellites (11) to provide estimates of position coordinates for the vehicle,
- a central processing unit (CPU) (23) that implements a method for zone based detection of vehicles passing into and out from the geographical zone using polygons to define the border of said geographical zone, wherein a first polygon (32) defines a first virtual border, wherein a vehicle is compared by use of the (GNSS) system (10) comprising an on-board-unit (OBU) (12) of the on-board-units (OBUs) with solely the first virtual border to determine the vehicle is passing into the geographical zone,
- storage medium (25) for polygon definitions,
- a wireless communication unit (24), wherein
  the system is arranged to define a second polygon (31) larger than the first polygon (32) and completely enveloping said first polygon (32) with the geographical zone (34) between the first polygon (32) and the second polygon (31), the second polygon (31) defining a second virtual border, wherein the vehicle is compared by use of the GNSS system with solely the second virtual border to determine the vehicle is passing out the geographical zone, wherein a distance (r) between the first virtual border and the second virtual border varies along the respective polygon borders in accordance with predetermined local factors.

14. The system of claim 13, wherein the predetermined factors are selected from local geometry and topography.

15. The method of claim 1, wherein the predetermined factors are selected from local geometry and topography.

* * * * *